US012399799B2

(12) United States Patent
Xue et al.

(10) Patent No.: US 12,399,799 B2
(45) Date of Patent: Aug. 26, 2025

(54) METHOD, ELECTRONIC DEVICE, AND COMPUTER PROGRAM PRODUCT FOR TRACING INFORMATION

(71) Applicant: DELL PRODUCTS L.P., Round Rock, TX (US)

(72) Inventors: Yongbing Xue, Shanghai (CN); Mengze Liao, Shanghai (CN); Weiyang Liu, Shanghai (CN); Yuanyi Liu, Shanghai (CN); Jinjin Wang, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 9 days.

(21) Appl. No.: 18/214,298

(22) Filed: Jun. 26, 2023

(65) Prior Publication Data

US 2024/0385940 A1    Nov. 21, 2024

(30) Foreign Application Priority Data

May 18, 2023  (CN) .......................... 202310565115.4

(51) Int. Cl.
*G06F 11/34* (2006.01)
(52) U.S. Cl.
CPC ................. *G06F 11/3476* (2013.01)
(58) Field of Classification Search
CPC .... G06F 9/45558; G06F 9/4557; G06F 9/505; G06F 9/5077; G06F 9/5083; G06F 3/067; G06F 2009/45591; G06F 11/3466; G06F 11/3476; G06F 11/3495
See application file for complete search history.

(56) References Cited

U.S. PATENT DOCUMENTS

2022/0398151 A1* 12/2022 Nandavar ........... G06F 11/0781

OTHER PUBLICATIONS

9cv9 HR and Career Blog, "What are Get, Post, Put, Patch, Delte? A walkthrough with JavaScript's Fetch API", Jul. 9, 2019 (Year: 2019).*

* cited by examiner

*Primary Examiner* — Michael Maskulinski
(74) *Attorney, Agent, or Firm* — WOMBLE BOND DICKINSON (US) LLP

(57) ABSTRACT

Embodiments of the present disclosure provide a method, an electronic device, and a computer program product for tracing information. The method includes: receiving an information acquisition request from a work container, the information acquisition request comprising information about a workload of the work container; determining, based on the information about the workload, a group to which the workload belongs; determining tracing information corresponding to the group, the tracing information being used for associating a log of the workload with logs of related workloads of the workload; and sending the tracing information to the work container. With the method according to embodiments of the present disclosure, the work container does not need to save a tracing context for each workload. This can save storage space in the work container, even without taking up storage space in the work container.

20 Claims, 12 Drawing Sheets

METHOD, ELECTRONIC DEVICE, AND COMPUTER PROGRAM PRODUCT FOR TRACING INFORMATION

CROSS-REFERENCE TO RELATED APPLICATION

This patent application claims priority, under 35 U.S.C. § 119, of Chinese Patent Application No. 202310565115.4, filed May 18, 2023, which is incorporated by reference in its entirety.

TECHNICAL FIELD

Embodiments of the present disclosure relate to the technical field of computers, and in particular, to a method, an electronic device, and a computer program product for tracing information.

BACKGROUND

Distributed tracing is becoming increasingly important in distributed systems today. Distributed tracing helps to combine associated tasks together. For example, when a task involves three containers/processes to complete its subtasks, container A calls an application programming interface (API) of container B to complete some subtasks, and container B calls an API of container C to complete some other subtasks. A tracing context is passed from a caller to a callee along with an API call, and the callee receives the tracing context, thus knowing that it is related to the same task. Therefore, distributed tracing is an important tool for developing, debugging, analyzing, and dissecting a system.

SUMMARY OF THE INVENTION

According to example embodiments of the present disclosure, a technical solution for tracing information is provided, which can be used to reduce the occupation of storage space in a work container.

In a first aspect of the present disclosure, a method is provided. The method may include: receiving an information acquisition request from a work container, the information acquisition request comprising information about a workload of the work container; determining, based on the information about the workload, a group to which the workload belongs; determining tracing information corresponding to the group, the tracing information being used for associating a log of the workload with logs of related workloads of the workload; and sending the tracing information to the work container. Implementation of the method provided in the first aspect can reduce the occupation of storage space in the work container.

In a second aspect of the present disclosure, an electronic device is provided. The electronic device includes: a processor; and a memory coupled to the processor and having instructions stored therein, where the instructions, when executed by the electronic device, cause the electronic device to perform operations including: receiving an information acquisition request from a work container, the information acquisition request comprising information about a workload of the work container; determining, based on the information about the workload, a group to which the workload belongs; determining tracing information corresponding to the group, the tracing information being used for associating a log of the workload with logs of related workloads of the workload; and sending the tracing information to the work container. Implementation of the electronic device provided in the second aspect can reduce the occupation of storage space in the work container.

In a third aspect of the present disclosure, a computer program product is provided. The computer program product is tangibly stored in a computer-readable medium and includes computer-executable instructions, wherein the computer-executable instructions, when executed, cause a computer to perform the method according to the first aspect of the present disclosure.

As can be seen from the above description, the solutions according to the embodiments of the present disclosure are capable of reducing the occupation of storage space in the work container. It should be understood that the Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which.

DETAILED DESCRIPTION

Figure 1:
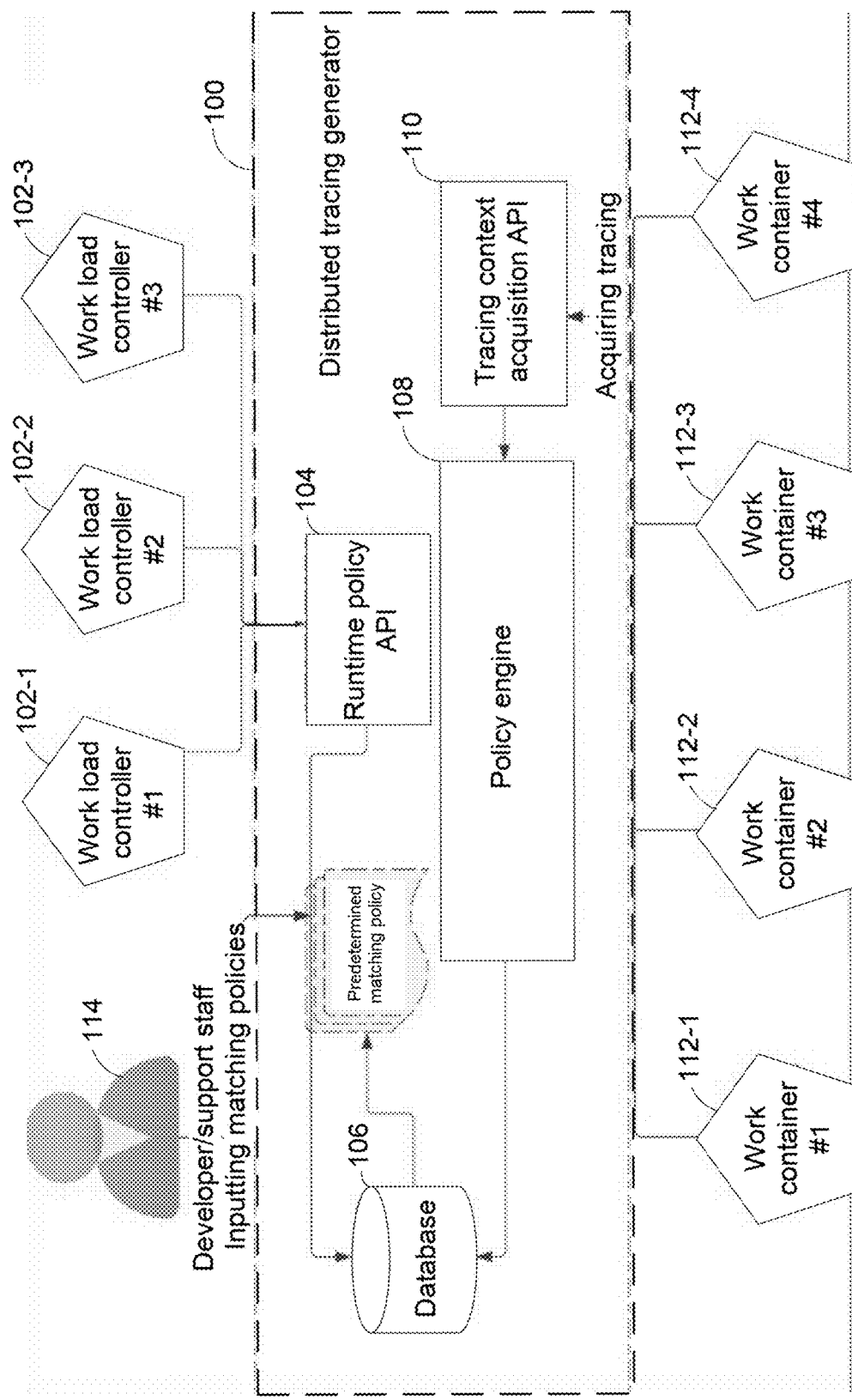
FIG. 1 illustrates an architectural diagram of a distributed tracing generator according to some embodiments of the present disclosure.

The embodiments of the present disclosure will be described in more detail below with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In a distributed system, distributed tracing is a method for confirming associated tasks. By allocating the same tracing context to the associated tasks, multiple tasks can be associated together, and information such as task logs of the associated tasks can be stored based on this tracing context, thus facilitating subsequent acquisition of information about the associated tasks by developers, users, and other personnel. For example, in distributed micro-services, methods for distributed tracing are widely applied to associate associated tasks performed by different micro-service modules together when a user sends a request to a micro-service system, and developers, users, and other personnel can trace the information about each associated task corresponding to the request for subsequent troubleshooting, data filtering, and other operations.

However, a work container in current distributed tracing technologies must save each tracing context for each workload. Each work container must have storage support and consume additional storage. Furthermore, work containers must implement their own logics for storing, acquiring, and deleting a tracing context, which requires more development.

The present disclosure proposes a method, an electronic device, and a computer program product for tracing information. The method for setting tracing information of the present disclosure includes: receiving an information acquisition request from a work container, the information acquisition request comprising information about a workload of the work container; determining, based on the information about the workload, a group to which the workload belongs; determining tracing information corresponding to the group, the tracing information being used for associating a log of the workload with logs of related workloads of the workload; and sending the tracing information to the work container. By implementing the method proposed in the present disclosure, a work container does not need to save a tracing context for each workload. This can save storage space in the work container, even without taking up storage space in the work container. In addition, workloads can be grouped without allocating a corresponding tracing context to each workload, thus reducing the occupation of the storage space.

Figure 2:
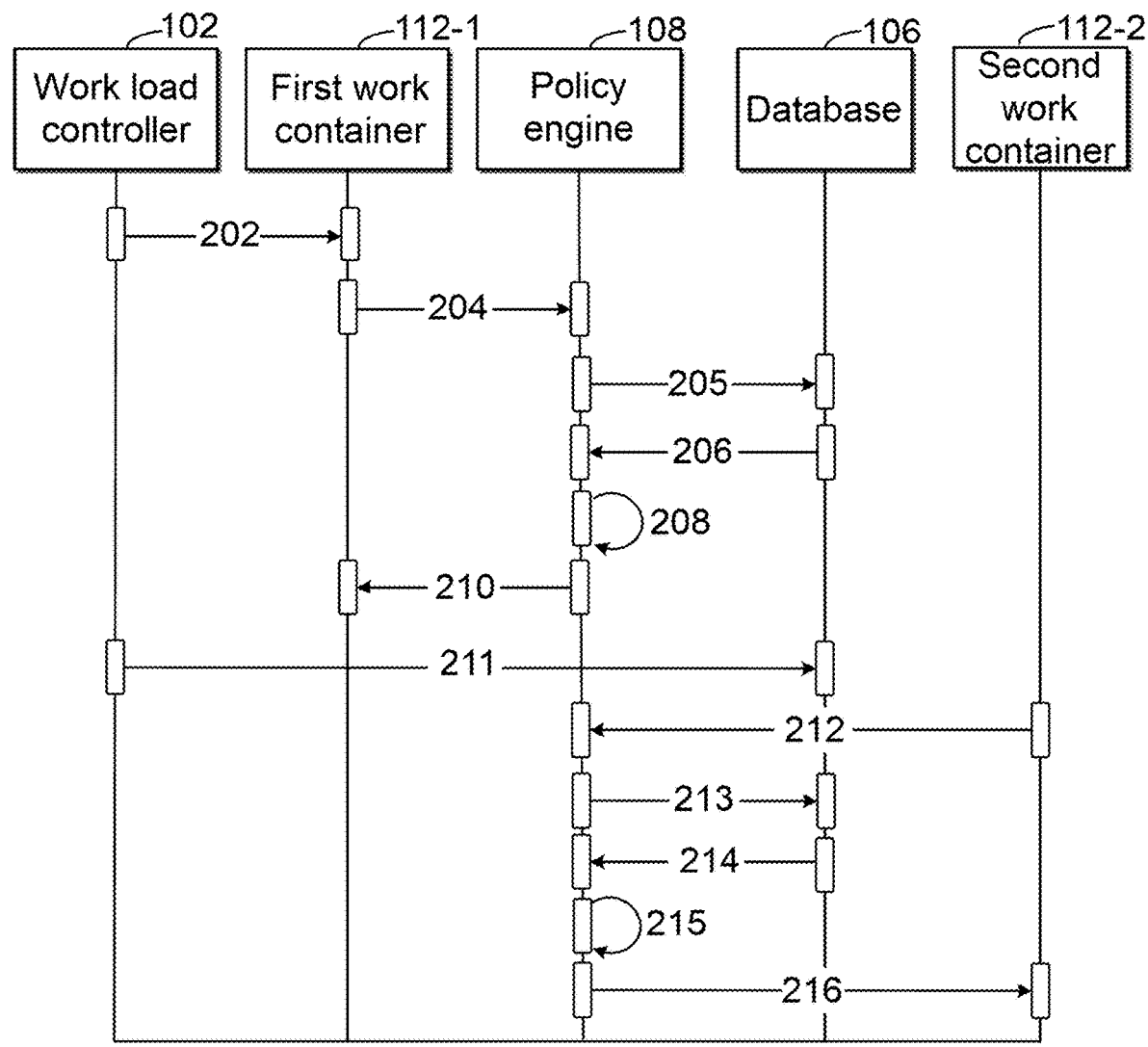
FIG. 2 illustrates a work timing sequence diagram of the distributed tracing generator according to some embodiments of the present disclosure.

The method proposed in the present disclosure is described below with reference to FIG. 1. FIG. 1 illustrates an architecture of a distributed tracing generator 100 for distributed tracing of an asynchronous distributed system, as well as workload controllers 102-1 through 102-3 that utilize the distributed tracing generator 100. It can be understood that the workload controllers 102-1 through 102-3 can be collectively or individually referred to as a workload controller 102. The distributed tracing generator 100 includes a runtime policy API 104, a database 106, a policy engine 108, and a tracing context acquisition API 110. In addition, FIG. 1 further illustrates work containers 112-1 to 112-4 associated with the workload controller 102. It can be understood that the work containers 112-1 to 112-4 can be collectively or individually referred to as a work container 112. It can be understood that the distributed tracing generator 100 illustrated in FIG. 1 can be applied in distributed systems for different uses. For example, the distributed tracing generator 100 illustrated in FIG. 1 can be used in a micro-service architecture. FIG. 2 illustrates a work timing sequence diagram of the distributed tracing generator 100 in FIG. 1, and the distributed tracing generator 100 is described below in conjunction with FIG. 1 and FIG. 2.

Upon receipt of an input load by the workload controller 102, the workload controller 102 may allocate 202 the input load, with at least a portion of the input load being allocated as the workload of the first work container 112-1 to the first work container 112-1. In FIG. 2, the first work container being the work container 112-1 is illustrated as an example, although this correspondence cannot be construed as a limitation to the present disclosure. For example, when the distributed tracing generator 100 is applied to the micro-service architecture of an e-commerce service, the workload controller 102 acquires an input load after a user inputs an ordering request, wherein the input load may include workloads corresponding to a generated order on micro-service modules such as payment, order management, message notification, and so on.

After the allocated workload is deployed on the first work container 112-1, when to execute the task corresponding to the workload, the work container 112 can send an information acquisition request 204 to the policy engine 108 through the tracing context acquisition API 110, this information acquisition request including the information about the workload of the first work container 112-1. In some examples, the information acquisition request may include at least one of an identifier for identifying the work container of the first work container 112-1, an identifier for identifying the workload, and a work time for the workload (i.e., an execution time for the task corresponding to the workload).

For example, after the workload controller allocates a workload to each work container in the micro-service architecture of the e-commerce service, if the task corresponding to the workload deployed on the order management needs to be executed first, upon reaching the execution time or approaching the execution time, the work container to which the order management module belongs may send an information acquisition request to the policy engine, where the information acquisition request may include at least one of an identifier of the work container to which the order management module belongs, an identifier of the workload deployed on the order management, and the work time for the workload deployed on the order management.

After receiving the information acquisition request, the policy engine 108 determines, based on the information about the workload, the group to which the workload belongs, and sends the tracing information corresponding to the group, i.e., the tracing context, to the first work container 112-1 via the tracing context acquisition API 110, where the tracing context is used to associate a log of the workload with logs of related workloads of the workload. The related workloads of a workload can be defined according to actual situation requirements. For example, if the workload is a workload corresponding to an order in the above e-commerce scenario, all or part of the other workloads corresponding to the same order can be used as the related workloads of that workload.

In some examples, the policy engine 108 may request 205 a set of matching policies from the database 106, and after the database 106 returns 206 the set of matching policies, the policy engine 108 determines 208, based on the set of matching policies, the group to which the workload belongs, and then sends 210 the tracing context corresponding to that group to the first work container 112-1 via the tracing context acquisition API 110. Among them, the tracing context acquisition API 110 can be implemented by the code "POST https://DISTRIBUTED TRACING GENERATOR IP/api/vracing-context/search." Since different work containers have the same standard API to acquire tracing contexts, a little development time is required.

In some examples, matching policies in the set of matching policies may include one or more of the following types of policies: regular policy, process policy, sequential policy, and time-frame policy. Among them, the regular policy is to group workloads whose identifiers satisfy a first predefined condition into one group. The process policy is to group workloads whose identifiers satisfy a second predetermined condition and whose identifiers of work containers satisfy a third predetermined condition into one group. The sequential policy is to group m workloads whose identifiers satisfy a fourth predetermined condition into a group, where m is a positive integer. The time-frame policy is to group workloads whose identifiers satisfy a fifth predetermined condition and for which the time when the policy engine 108 acquires the information acquisition request satisfies a sixth predetermined condition (e.g., within a predetermined time range) into a group. For ease of understanding, reference can be made to the schematic illustrations of different types of matching policies in Tables 1-4, where example cases of one predetermined condition of the regular policy, the process policy, the sequential policy, and the time-frame policy are illustrated in Tables 1-4, respectively:

TABLE 1

An example case of one predetermined condition of the regular policy

| Matching policy | Identifier of workload | Tracing context |
|---|---|---|
| Regular policy | 1 | efbec362-1027-4410-92cc-95a94bd75468 |

TABLE 2

An example case of one predetermined condition of the process policy

| Matching policy | Identifier of workload | Identifier of work container | Tracing context |
|---|---|---|---|
| Process policy | 2 | 1; 2 | cfed4efe-cb7d-44a7-8067-cf13e36ffb36 |
| Process policy | 2 | 3 | cd084438-54f1-4070-9a6b75275720aeb6 |

TABLE 3

An example case of one predetermined condition of the sequential policy

| Matching policy | Identifier of workload | Count | Tracing context |
|---|---|---|---|
| Sequential policy | 3 | 3 | cc32f592-12b9-4ffd-bc24-f98a7800b752 |

TABLE 4

An example case of one predetermined condition of the time-frame policy

| Matching policy | Identifier of workload | Starting point of time range |
|---|---|---|
| Time-frame policy | 4 | 2022-12-01T01:23:04Z |
| End point of time range | | Tracing context |
| 2022-12-04T01:23:04Z | | 7882d3d4-1dec-48dc-b3de-a2e54658a42d |

It should be understood that the set of matching policies may include one or more types of matching policies, the number of each type of matching policies may also be one or more, and for multiple matching policies of the same type, corresponding predetermined conditions thereof may also be different. For example, when the set of matching policies includes two regular policies, i.e., regular policy A and regular policy B, the first predetermined condition corresponding to the regular policy A may be that the identifier of the workload is 1, and the second predetermined condition corresponding to the regular policy B may be that the identifier of the workload is 2. For other types of matching policies, no further details are provided. The types of matching policies described above should not be construed as a limitation to the present disclosure.

In some examples, the tracing context corresponding to the group may be the tracing context corresponding to the matching policy in which the information about the workload satisfies its predetermined condition. In some cases, the tracing context corresponding to the matching policy may be set and stored in the database 106 together with the matching policy during the process of storing the matching policy in the database 106 by the developer/support staff 114. It should be noted that in the embodiments of the present disclosure, updates (which may include at least one of creating, modifying, and deleting) to matching policies in the database 106 may be performed at non-runtime or may be performed at runtime by the developer/support staff 114 and/or the workload controller 102 by issuing at least one of create, modify, and delete instructions via the runtime policy API 104. The runtime policy API 104 can create, read, modify, and delete the set of matching policies stored in the database 106. For example, the developer/support staff 114 can read all of the sets of matching policies at runtime via the runtime policy API 104, or read a specific matching policy based on the ID of each matching policy in the set of matching policies, or create a new matching policy, or modify/update an existing matching policy, and so on. For example, with the codes of "GET https://DISTRIBUTED TRACING GENERATOR IP/api/v1/rules," "GET https://DISTRIBUTED TRACING GENERATOR IP/api/v1/rules/{id}," "POST https://DISTRIBUTED TRACING GENERATOR IP/api/v1/rules," and "PUT https://DISTRIBUTED TRACING GENERATOR IP/api/v1/rules/{id}," it is possible to implement the functions of all sets of matching policies, reading a specific matching policy based on the ID of each matching policy in the set of matching policies, creating a new matching policy, and modifying/updating an existing matching policy, respectively.

In some other cases, the tracing context corresponding to a matching policy may be automatically generated after the matching policy is stored to the database 106 or after the first workload in the corresponding group is determined. The present invention does not limit the generation methods and generation algorithms for tracing contexts.

Thus, given that the implementation of each of the storage, acquisition, and deletion logics for tracing contexts is different and error-prone for different developers, based on the distributed tracing generator 100 provided in FIG. 1, the policy for asynchronous task grouping provided by the present disclosure can be modified at runtime based on the API, which is less error-prone, and there is no need to release software to change the policy.

Figure 3:
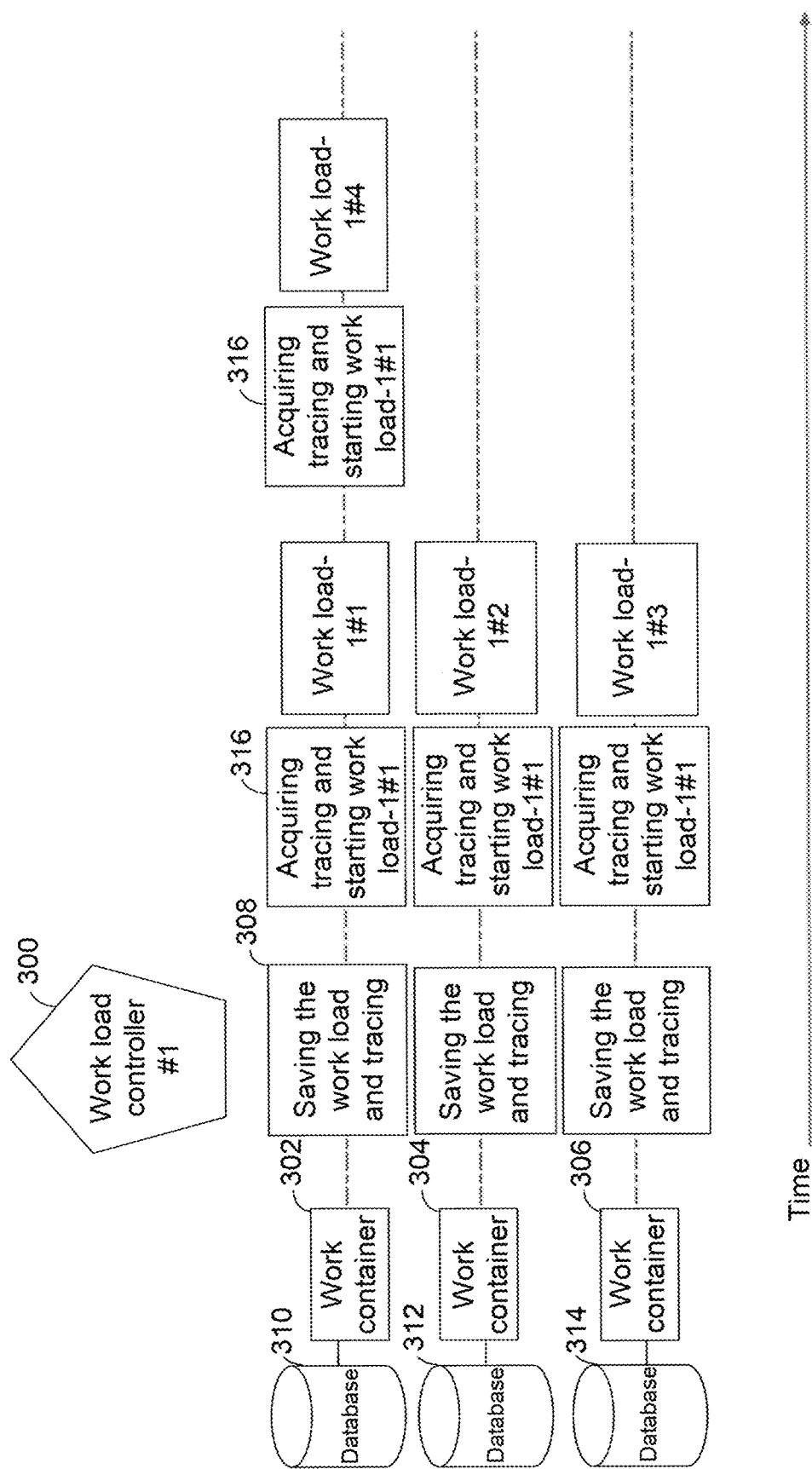
FIG. 3 illustrates a schematic diagram of distributed tracing in an asynchronous distributed system according to some embodiments of the present disclosure.
Figure 4:
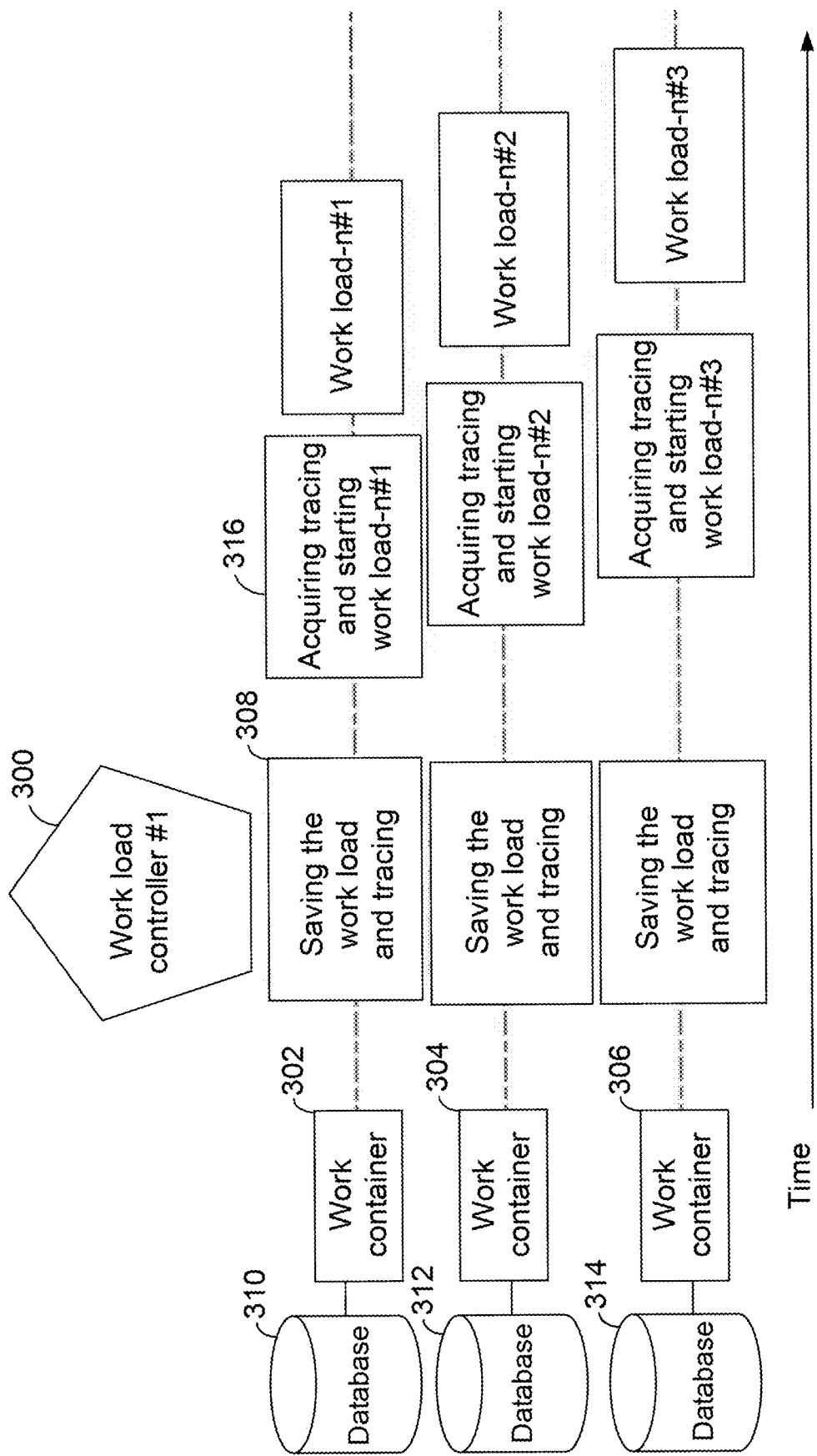
FIG. 4 illustrates another schematic diagram of distributed tracing in an asynchronous distributed system according to some embodiments of the present disclosure.

For ease of understanding, reference may be made to FIG. 3. FIG. 3 is a schematic diagram illustrating distributed tracing in an asynchronous distributed system. For example, the workload controller 300 may allocate workload-1 #1-workload-1 #4 on work containers 302, 304, and 306, that is, the workload controller 300 allocates input load-1 as workload-1 #1 and workload-1 #4, workload-1 #2, and workload-1 #3 on work containers 302, 304, and 306, respectively. If, when determining groups, the grouping of workload-1 #1-workload-1 #4 is performed based on a regular policy, then since the identifiers of the workloads of workload-1 #1-workload-1 #4 are all 1, workload-1 #1-workload-1 #4 can be grouped into one group, and the tracing context corresponding to the regular policy is used as the tracing context for workload-1 #1-workload-1 #4, and sent separately to the corresponding work containers 302, 304, and 306. As can be seen, when a workload is triggered, the work container can acquire a tracing context by the method proposed in the present disclosure to perform the task 316 corresponding to the workload without saving 308 its tracing context in its own database 310, 312, and 314. FIG. 4, based on FIG. 3, illustrates a case in which workloads have different timing sequences. Similarly, if the grouping of workload-n #1-workload-n #3 is based on a regular policy, then since the identifiers of the workloads of workload-n #1-workload-n #3 are all n, workload-n #1-workload-n #3 can be grouped into one group, and the tracing context corresponding to the regular policy is used as the tracing context for workload-n #1-workload-n #3, and sent separately to the corresponding work containers 302, 304, and 306. Table 1 above can be referred for the description of the matching policies here and below, which will not be repeated subsequently.

As can be seen, work containers do not need to save each tracing context for each workload, so during a distributed tracing process, there is no need for storage support for each work container, and no need to consume additional storage, such as databases 310, 312, and 314 in FIG. 3 and FIG. 4. In addition, during the process of acquiring the tracing context 316, the work container does not need to implement its own logics for storing, acquiring, and deleting the tracing context.

In some embodiments, the set of matching policies includes a plurality of matching policies. For example, the database 106 may include a plurality of regular policies at the same time, or may also include a regular policy, a process policy, a sequential policy, and a time-frame policy at the same time. At this point, whether each matching strategy matches the workload can be judged in turn based on a predetermined order between the matching strategies, until a first matching target matching policy is obtained, and then the workload is grouped into the group corresponding to the target matching policy.

In some examples, the predetermined order may include a first order determined based on a policy granularity size relationship among different types of matching policies. For example, since the policy granularity size relationship among the regular policy, the process policy, the sequential policy, and the time-frame policy is: the regular policy>the process policy>the sequential policy>the time-frame policy, the first order can be that the regular policy<the process policy<the sequential policy<the time-frame policy, which means that the priority order of the regular policy, the process policy, the sequential policy, and the time-frame policy during matching is the time-frame policy, the sequential policy, the process policy, and the regular policy. For easy understanding, workload-1 #1 in FIG. 3 is used as an example for illustration. When the task corresponding to workload-1 #1 is to be executed, workload-1 #1 can be matched with the time-frame policy first, and the above may be specifically referred for the method of matching. If there is no matching policy in the time-frame policy that matches workload-1 #1, the sequential policy is matched with workload-1 #1, and the description will not be repeated subsequently, until the target matching policy matching workload-1 #1 is obtained. Then, workload-1 #1 is grouped into the group corresponding to the target matching policy. It can be understood that after the group is determined, the matching between the workload and the matching policies can be stopped, and if matching with all matching policies in the set of matching policies has been conducted but no group is determined, new tracing information about the workload can be generated and stored in a database of or associated with the work container for subsequent acquisition.

Figure 5:
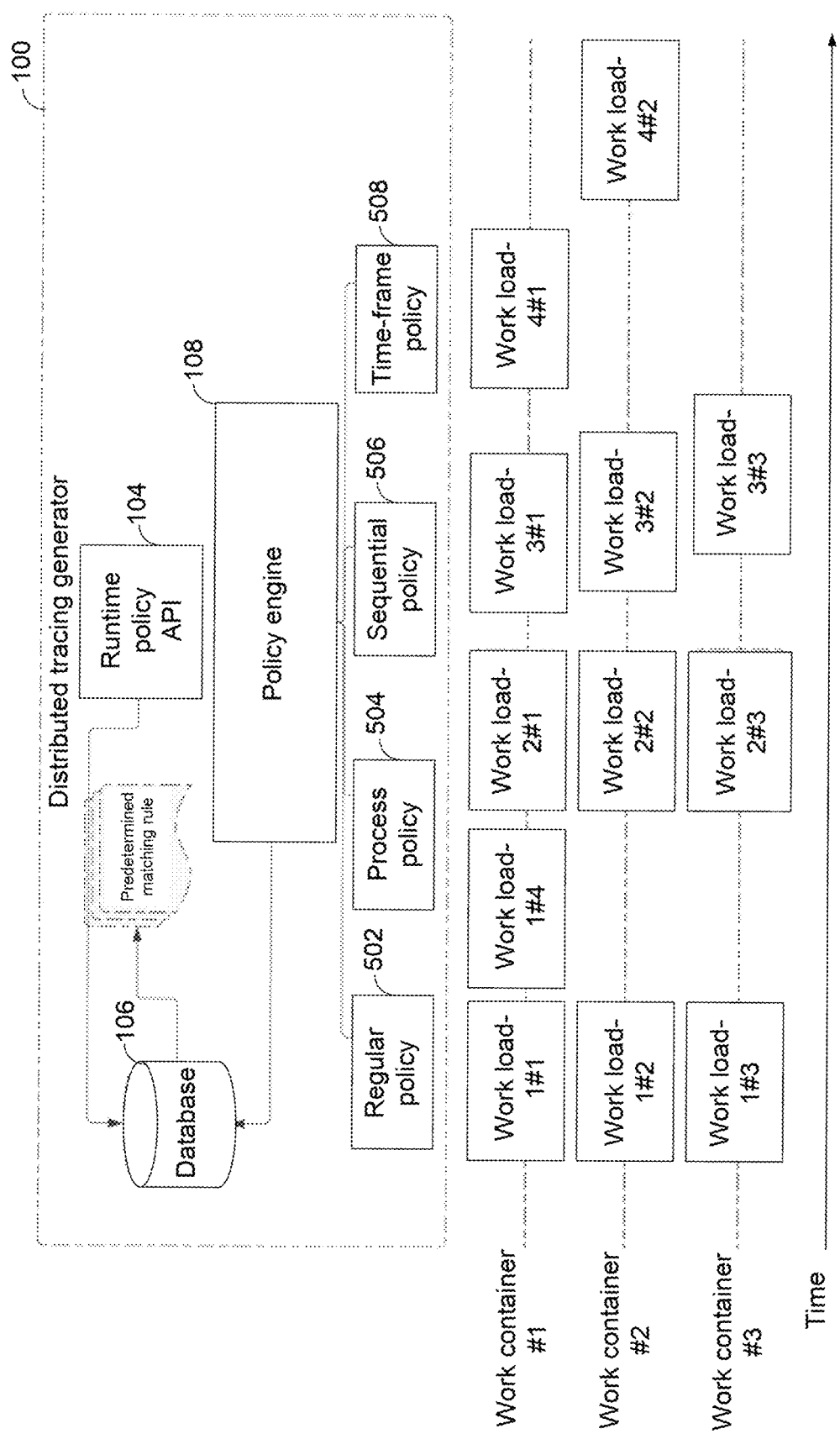
FIG. 5 illustrates a schematic diagram after grouping workloads on a work container according to some embodiments of the present disclosure.

Referring to FIG. 5. FIG. 5 illustrates a schematic diagram after grouping the workloads on the work container when the set of matching policies includes the regular policy, the process policy, the sequential policy, and the time-frame policy at the same time. Here, workload-1 #1-workload-1 #4 are grouped by the policy engine 108 into the group corresponding to the regular policy 500, workload-2 #1-workload-2 #3 are grouped by the policy engine 108 into the group corresponding to the process policy 502, workload-3 #1-workload-3 #3 are grouped by the policy engine 108 into the group corresponding to the sequential policy 504, and workload-4 #1-workload-4 #2 are grouped by the policy engine 108 into the group corresponding to the time-frame policy 506.

Matching as described in the present disclosure may refer to the determination of whether the information required for the matching policy (e.g., the information required to satisfy the predetermined condition of the matching policy) is included in the information about the workload. For example, for the regular policy A and the regular policy B mentioned above, if they are separately matched to the workload, when the information about the workload includes identifier 1 of the workload, it can be determined that the workload matches the regular policy A, and when the information about the workload includes identifier 2 of the workload, it can be determined that the workload matches the regular policy B. Further, assuming that there are a process policy C and a process policy D, and their required information is identifier 1 of the workload and identifier 1 of the work container and identifier 2 of the workload and identifier 2 of the work container, respectively, then if, in the information about the workload, the identifier of the workload is 1 and the identifier of the work container is 2, it can be understood that this workload does not match the process policy C or the process policy D; whereas if, in the information about the workload, the identifier of the workload is 1 and the identifier of the work container is 1, then this workload matches the process policy C but does not match the process policy D. For other types of matching policies, no further details will be given. With the sequential matching approach, confusion can be avoided, and in some examples, a predetermined order can be determined based on the policy granularity relationship for effective and precise grouping.

Figure 6:
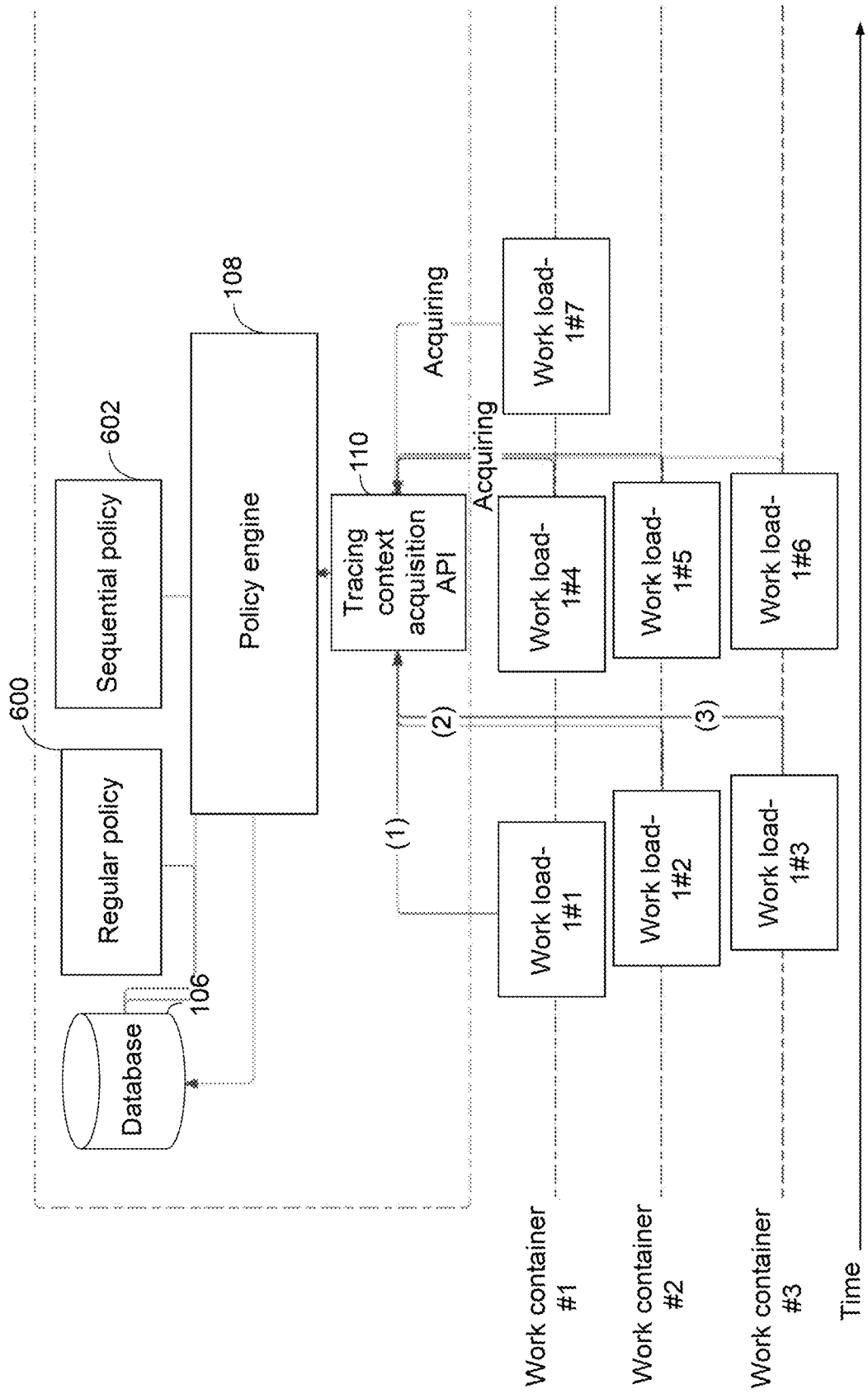
FIG. 6 illustrates a schematic diagram of matching workloads to matching policies according to some embodiments of the present disclosure.
Figure 7:
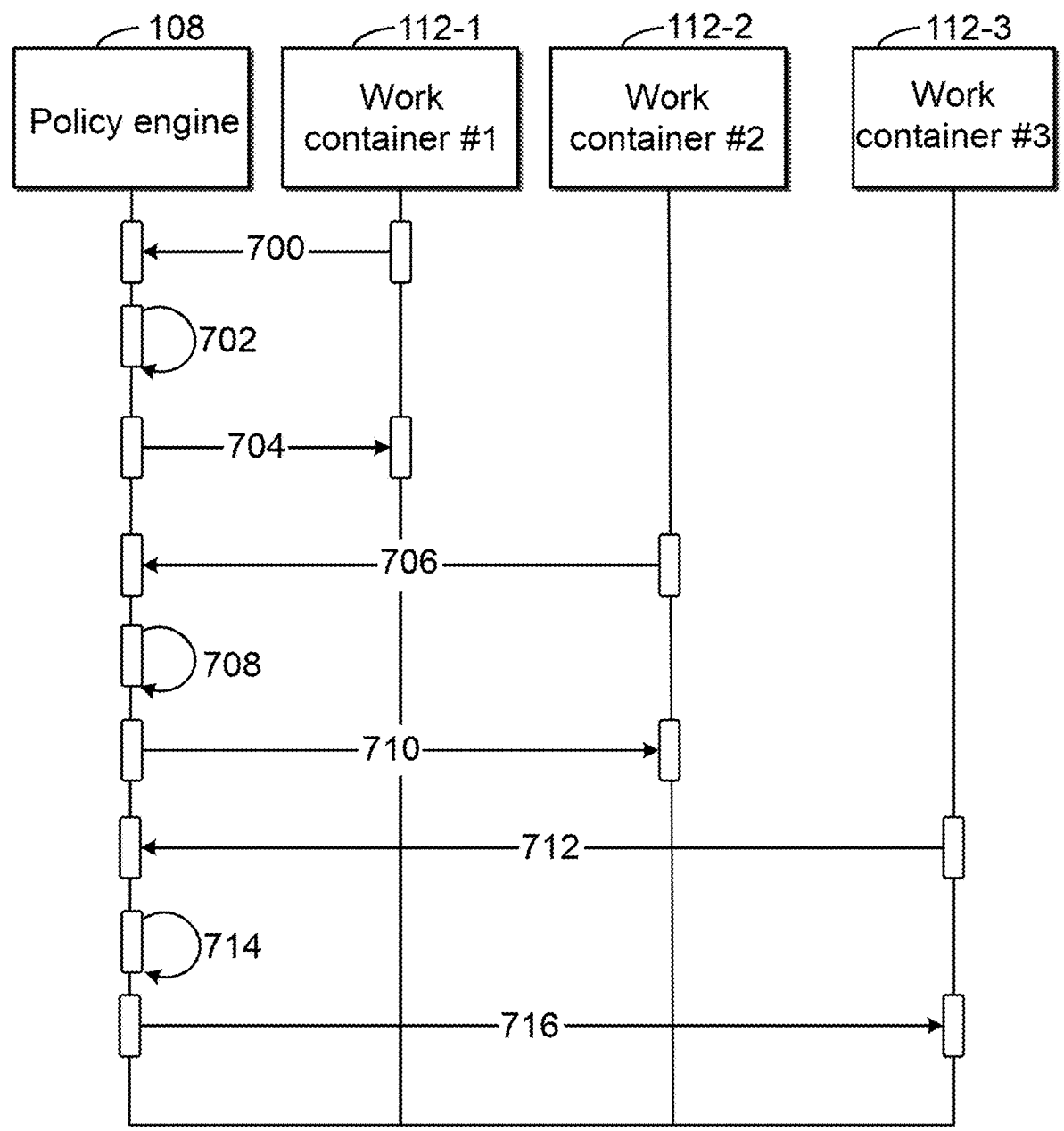
FIG. 7 illustrates a timing sequence diagram of matching workloads to matching policies according to some embodiments of the present disclosure.

For ease of understanding, FIG. 6 and the timing sequence diagram FIG. 7 corresponding to FIG. 6 are used as examples to illustrate specifically a case of matching workloads to matching policies in a sequential manner. Assume that the predetermined order includes a first order based on the policy granularity size: the regular policy<the process policy<the sequential policy<the time-frame policy, and that the database 106 only includes one regular policy 600 and one sequential policy 602, the information required for the regular policy 600 being the identifier 1 of the workload and the information required for the sequential policy 602 being the identifier 1 of the workload, and that two workloads are grouped into one group, i.e., m in the above is 2, where the identifier 1 of the workload is predefined in the database 106 in the distributed tracing generator 100.

According to the timing sequence, when the work container 112-1 requests a tracing environment 700 from the distributed tracing generator 100 based on the workload 1-#1 via the tracing context acquisition API 110, i.e., sends the information acquisition request, the policy engine 108 matches 702 the regular policy 600 and the sequential policy 602 with the workload 1-#1. Since the sequential policy 602 has the minimum policy granularity and its order is before the regular policy 600, the sequential policy 602 is first matched with the workload 1-#1; since the identifier of the workload is 1, then the sequential policy 602 is the target matching policy corresponding to the workload 1-#1, and then the workload 1-#1 is grouped into the group corresponding to the sequential policy 602; and the tracing context corresponding to the sequential policy 602 is sent 704 to the work container 112-1 via the tracing context acquisition API 110, and at the same time, the policy engine 108 decreases the count of the sequential policy 602 by 1.

After that, when the work container 112-2 requests a tracing environment 706 from the distributed tracing generator 100 based on the workload 1-#2 via the tracing context acquisition API 110, i.e., sends the information acquisition request, the policy engine 108 performs the same matching processing 708 and groups the workload 1-#2 into the group corresponding to the sequential policy 602, and sends 710 the tracing context corresponding to the sequential policy 602 to the work container 112-2 via the tracing context acquisition API 110, and at the same time, the policy engine 108 decreases the count of the sequential policy 602 by 1. At this point, since there are already 2 workloads in the group corresponding to the sequential policy 602 and the count is zero, it is possible to delete the sequential policy 602 from the set of matching policies to be matched in order to reduce the matching time, or it is also possible not to delete it but to mark the group corresponding to this matching policy as full by other methods so as to keep the matching policy from matching with other work containers. It is to be noted that deletion here refers to deletion from the set of matching policies to be matched with other work containers, not deletion from the database 106.

After that, when the work container 112-3 requests a tracing environment 712 from the distributed tracing generator 100 based on the workload 1-#3 via the tracing context acquisition API 110, i.e., sends the information acquisition request, the policy engine 108 performs the same matching processing 714. Assuming that the sequential policy 602 has been deleted from the matching policies to be matched, the policy engine 108 matches the workload 1-#3 only to the regular policy 600, groups the workload 1-#3 into the group corresponding to the regular policy 600, sends 716 the tracing context corresponding to the regular policy 600 to the work container 112-3 via the tracing context acquisition API 110, and then performs similar processing for the subsequent workloads 1-#4 to workloads 1-#7, which will not be repeated here. In the case of FIGS. 6 and 7, the workload 1-#1 and the workload 1-#2 are grouped by the same tracing environment and are considered to be related workloads, while the workload 1-#4 to workload 1-#7 are grouped into one group and use the same tracing environment.

Figure 8:
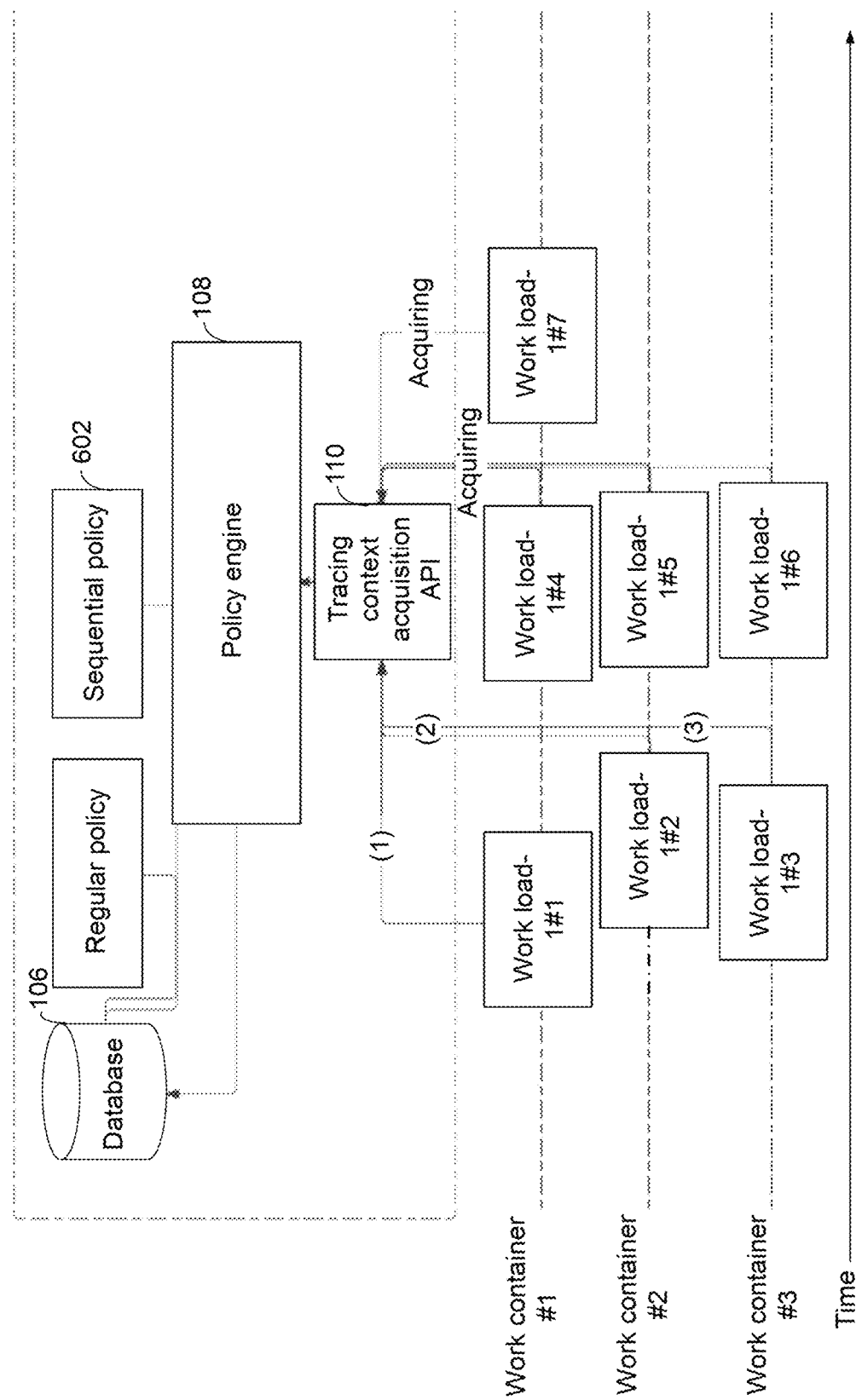
FIG. 8 illustrates another schematic diagram of matching workloads to matching policies according to some embodiments of the present disclosure.
Figure 9:
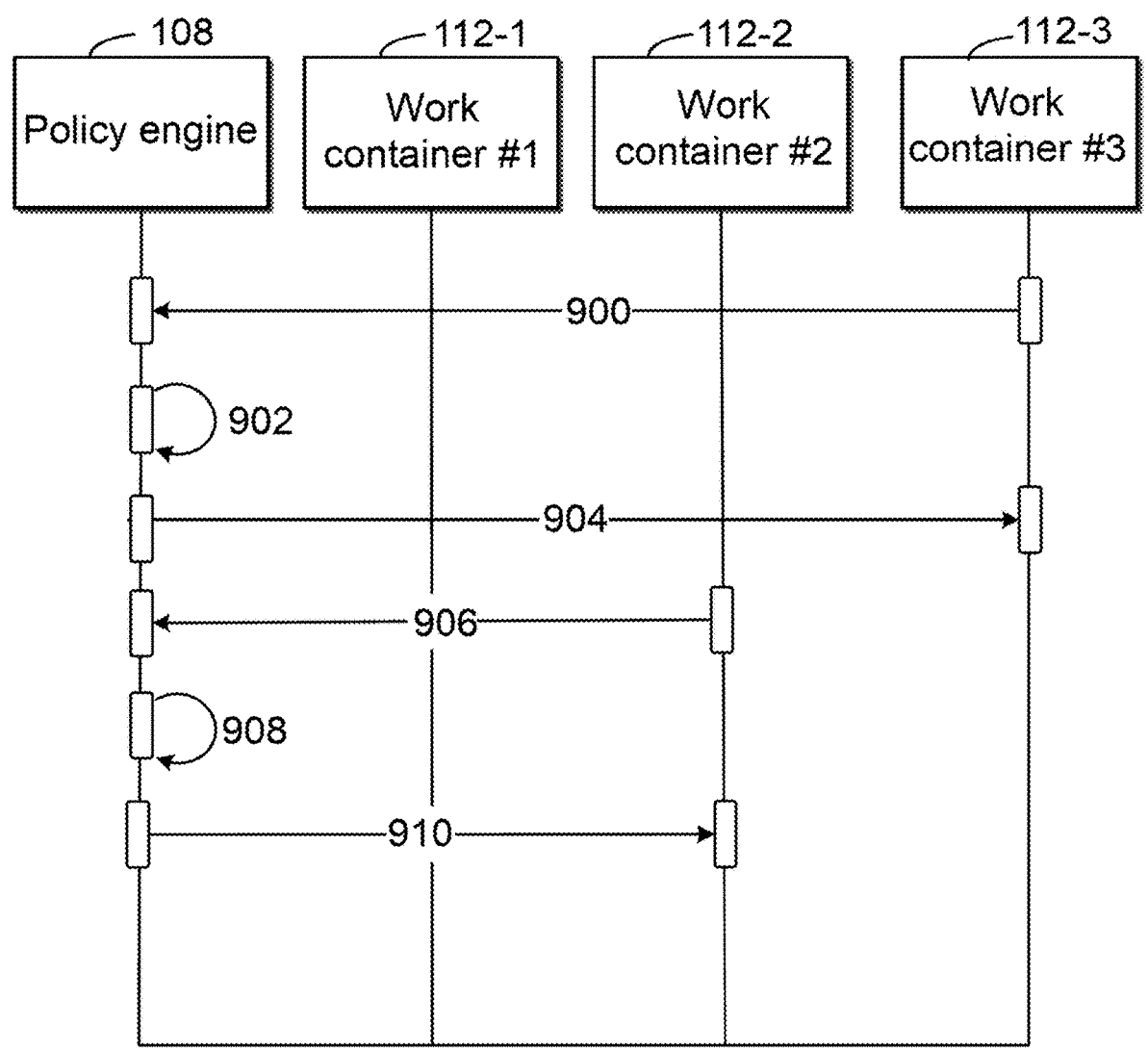
FIG. 9 illustrates another timing sequence diagram of matching workloads to matching policies according to some embodiments of the present disclosure.

For further illustration, reference is made to FIG. 8 and the timing sequence diagram FIG. 9 corresponding to FIG. 8. FIG. 8 is the situation in which a change occurs in the timing sequence between the workload-1 #2 and the workload-1 #3 in FIG. 6. It will be understood that, at this point, the situation after the policy engine 108 sends the tracing context to the work container 112-1 should be as follows:

when the work container 112-3 requests a tracing environment 900 from the distributed tracing generator 100 based on the workload 1-#3 via the tracing context acquisition API 110, i.e., sends the information acquisition request, the policy engine 108 performs the same matching processing 902 and groups the workload 1-#3 into the group corresponding to the sequential policy 602, and sends 904 the tracing context corresponding to the sequential policy 602 to the work container 112-3 via the tracing context acquisition API 110, and at the same time, the policy engine 108 decreases the count of the sequential policy 602 by 1. At this point, since there are already 2 workloads in the group corresponding to the sequential policy 602 and the count is zero, it is possible to delete the sequential policy 602 from the set of matching policies to be matched in order to reduce the matching time, or it is also possible not to delete it.

After that, when the work container 112-2 requests a tracing environment 906 from the distributed tracing generator 100 based on the workload 1-#2 via the tracing context acquisition API 110, i.e., sends the information acquisition request, the policy engine 108 performs the same matching processing 908. Assuming that the sequential policy 602 has been deleted from the matching policies to be matched, the policy engine 108 matches the workload 1-#2 only to the regular policy 600 and groups the workload 1-#2 into the group corresponding to the regular policy 600 and sends 910 the tracing context corresponding to the regular policy 600 to the work container 112-2 via the tracing context acquisition API 110.

In some examples, in addition to the first order described above, in order to be able to perform matching in order even when the set of matching policies includes a plurality of matching policies of the same type, the predetermined order may also include a second order among the plurality of matching policies of the same type. The present disclosure does not limit the second order, which can be set according to actual needs. For example, in the presence of a plurality of regular policies, the order of the identifiers of their required workloads may be used as the second order.

Returning to FIGS. 1 and 2, after sending 210 the tracing context corresponding to the group to the first work container 112-1 via the tracing context acquisition API 110, if the information acquisition request of the second work container 112-2 is received 212, the method provided above is used to request 213 the matching dataset, receive 214 the matching dataset, and match 215 the matching dataset with the workload of the second work container, so as to determine the group for the second work container. Likewise, the second work container in FIG. 2 is set as the work container 112-2 for convenience of illustration only, and the correspondence between the second work container and the work container 112-2 cannot be taken as a limitation to the present disclosure. If the grouping for the second work container 112-2 is the same as the grouping for the first work container 112-1, i.e., if the target matching policy matching the workload of the first work container 112-1 is the same as the target matching policy matching the workload of the second work container 112-2 when determining the grouping by matching the workload with the matching policies, the same tracing context as described above is sent 216 to the second work container 112-2 via the tracing context acquisition API 110.

In addition, it has been illustrated above that updates to matching policies in the database 106 may be performed at runtime by the developer/support staff 114 and/or the workload controller 102 issuing at least one of create, modify, and delete instructions via the runtime policy API 104. Thus, if prior to 212, the workload controller 102 issues runtime instructions to update 211 the matching policies in the database 106 via the runtime policy API 104, step 214 may be performed based on the updated set of matching policies, and the specific process will not be repeated. On the other hand, if the target matching policy matching the workload of the first work container 112-1 in step 208 is of a target type (e.g., a sequential policy to be counted) and the number of workloads in the group has reached a predetermined threshold (e.g., reaching m to make the count zero), runtime instructions may be issued automatically to update the set of matching policies to be matched with other work containers (e.g., by the policy engine 108, etc.), as the description of the sequential policies in FIG. 6 and/or FIG. 8 above can be specifically referred.

Figure 10:
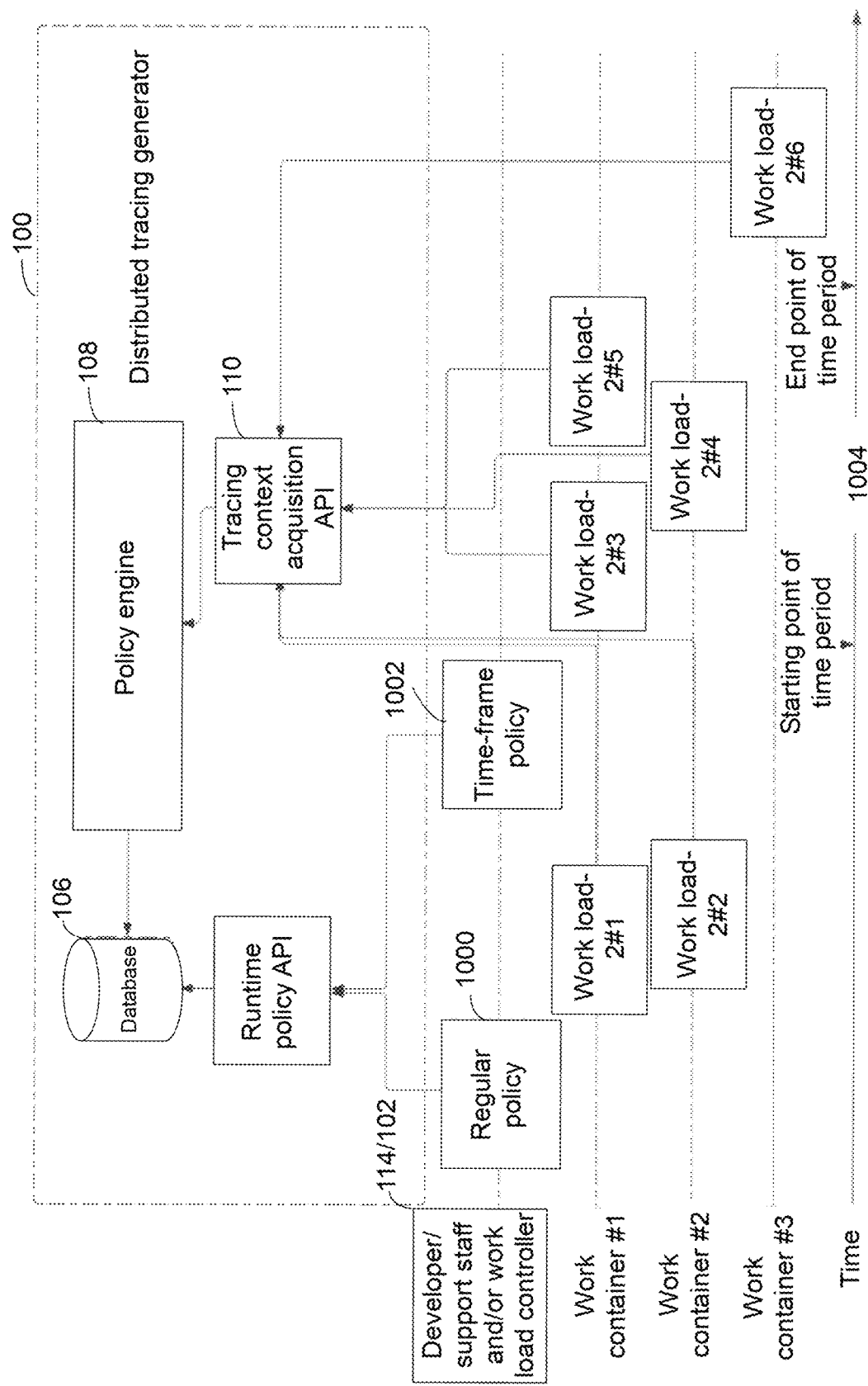
FIG. 10 illustrates a schematic diagram of updating a matching policy in a distributed tracing generator according to some embodiments of the present disclosure.

For a more specific explanation of the update to the matching policies in the database 106, reference is made to FIG. 10. FIG. 10 is a schematic diagram of updating the matching policies in the distributed tracing generator 100. Initially, the database 106 does not contain any matching policies, and the developer/support staff 114 and/or the workload controller 102 can create a regular policy 1000 in the database 106 via the runtime policy API 104. Then, when the workload-2 #1 on the work container #1 is to be executed, the work container #1 may send an information acquisition request to the updated distributed tracing generator 100 via the tracing context acquisition API 110, and the policy engine 108 acquires the regular policy 1000 from the database 106 and matches the regular policy 1000 with the workload-2 #1 and, if the regular policy 1000 is successfully matched with the workload-2 #1, groups the workload-2 #1 into the group corresponding to the regular policy 1000, and sends the tracing context corresponding to the regular policy 1000 to the work container #1 via the tracing context acquisition API 110. The same processing is performed for the workload-2 #2.

Furthermore, after the processing of the workload-2 #2 is completed (e.g., sending the tracing context corresponding to the regular policy 1000 to the work container #2, or generating a new tracing context for the workload-2 #2), the developer/support staff 114 and/or the workload controller 102 can create a time-frame policy 1002 in the database 106 via the runtime policy API 104. Then, when the workload-2 #3 on the work container #1 is to be executed, the work container #1 may send an information acquisition request to the updated distributed tracing generator 100 via the tracing context acquisition API 110, and the policy engine 108 acquires the regular policy 1000 and the time-frame policy 1002 from the database 106 and first matches the time-frame policy 1002 based on the predetermined order with the workload-2 #3; if the identifier of the workload of the workload-2 #3 includes the identifier of the workload required for the time-frame policy 1002 and the time at which the policy engine 108 acquires the information acquisition request corresponding to the workload-2 #3 that includes at least one time point in the time period 1004 corresponding to the time-frame policy 1002 (i.e., the time for the information acquisition request corresponding to the workload-2 #3 is within the time period 1004), then the workload-2 #3 is grouped into the group corresponding to the time-frame policy 1002, the tracing context corresponding to the time-frame policy 1002 is sent to the work container #1 via the tracing context acquisition API 110, and the same processing is performed for the workload-2 #4 and the workload-2 #5.

It can be understood that since the time for the information acquisition request corresponding to the subsequent workload-2 #6 is outside the time period 1004, the workload-2 #6 does not match the time-frame policy 1002, and at this point, it will be determined whether the regular policy 1000 matches the workload-2 #6. The subsequent steps will not be repeated.

Figure 11:
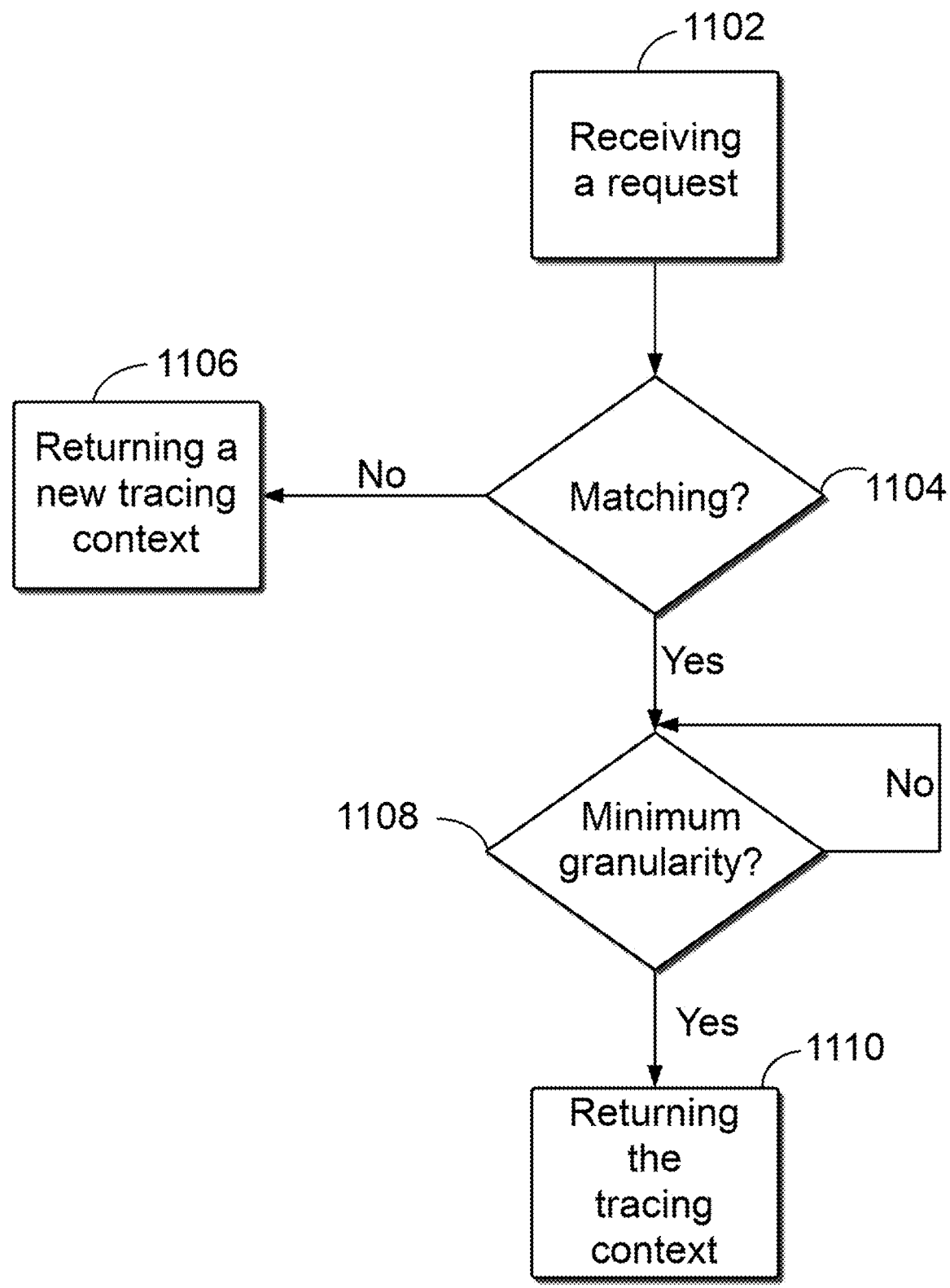
FIG. 11 illustrates a flow chart of distributed tracing according to some embodiments of the present disclosure.

In some examples, the method provided in the present disclosure may also perform the various steps in the process of distributed tracing in accordance with the flow of FIG. 11. At block 1102, the policy engine 108 receives an information acquisition request. At block 1104, the policy engine 108 determines whether a matching policy that matches the workload exists, and if such matching policy does not exist, generates a new tracing context for the workload at block 1106 and ends the flow. If it exists, it is determined at block 1108 whether the matching policy is at the minimum granularity, and if not, it is repeated until the matching policy is at the minimum granularity, the tracing context for the matching policy is returned at block 1110, and the flow ends.

Figure 12:
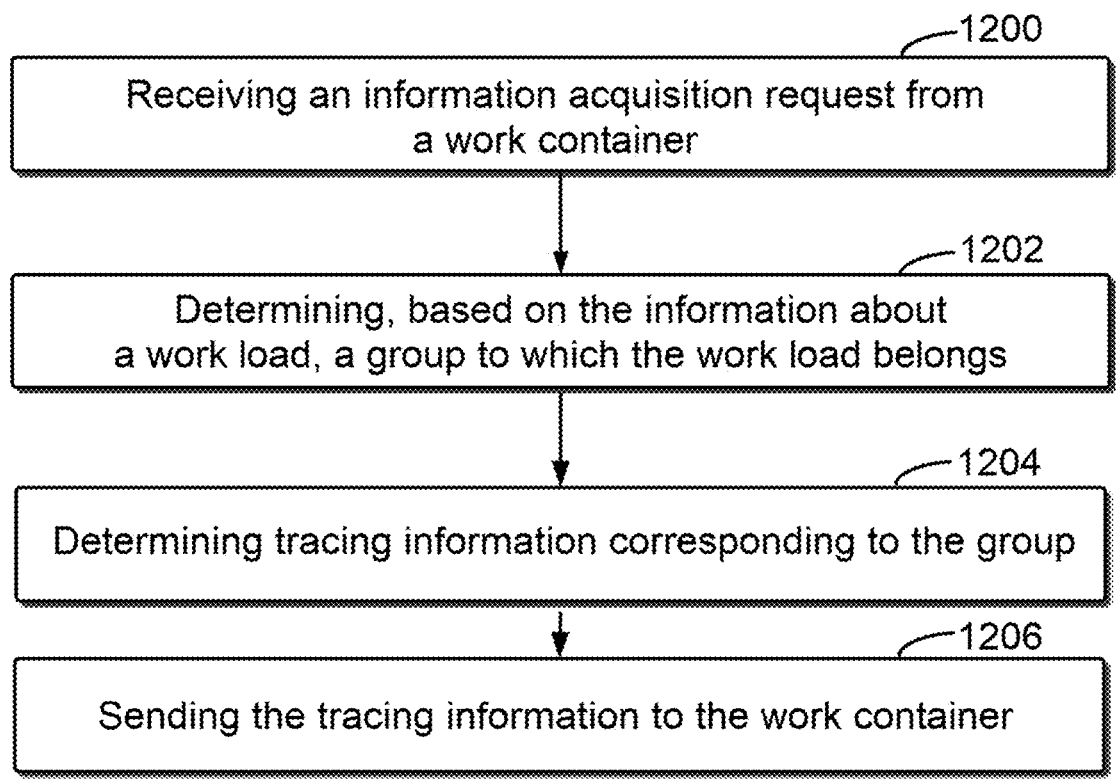
FIG. 12 illustrates another flow chart of distributed tracing according to some embodiments of the present disclosure.

In addition, the present disclosure further provides a method for tracing information. With reference to FIG. 12, at block 1200, an information acquisition request is received from a work container. At block 1202, a group to which a workload belongs is determined based on the information about the workload. At block 1204, the tracing information corresponding to the group is determined. At 1206, the tracing information is sent to the work container. After the work container receives the tracing information, it can associate the workload with the tracing information, and then, when storing a log of the workload, it can store the log in association with the logs of other related workloads for subsequent log queries. It can be understood that the method provided in FIG. 12 can be executed by the policy engine 108. For example, the policy engine 108 may determine the group to which the workload belongs by the method for matching the workload with matching policies, and when there are multiple matching policies, i.e., there exist a set of matching policies, it may match the workload with each matching policy in the set of matching policies in turn based on a predetermined order so as to determine the group for the workload. The above can be referred for specific implementation and will not be further described. In some embodiments, the predetermined order may be determined based on the policy granularity sizes of different types of matching policies. For example, a matching policy with a small policy granularity may be set to be ordered first, and a matching policy with a large policy granularity may be set to be ordered second, so as to improve the accuracy and efficiency of matching.

In some examples, the method provided by the present disclosure can be effective in improving the efficiency of developers/users in tracing data. For example, when performing grouping using a time-frame policy, a developer/user can perform tracing based on the execution time of a task corresponding to a workload. For another example, when performing grouping using a process policy, a developer/user can perform tracing based on the identifier of a workload and the identifier of a work container.

According to the various embodiments of the present disclosure described above and their combined embodiments, it is possible to improve the efficiency of configuring functional states. It should be understood that the implementations illustrated in FIGS. 1 through 12 above are only schematic, and depending on an actual application, the architecture or process illustrated in FIGS. 1 through 12 may be in other different forms and may also include more or fewer one or more functional modules and/or units, which may be partially or fully implemented as hardware modules, software modules, firmware modules, or any combination thereof, and embodiments of the present disclosure are not limited in this regard.

It can be understood that the specific names and/or protocols of the various components of the system described herein are intended only to help those skilled in the art better understand the ideas of the present disclosure and are not intended to limit the scope of the present disclosure in any way. Further, in some other embodiments, more or better components may be included, as well as alternative components having the same or similar functionality.

Figure 13:
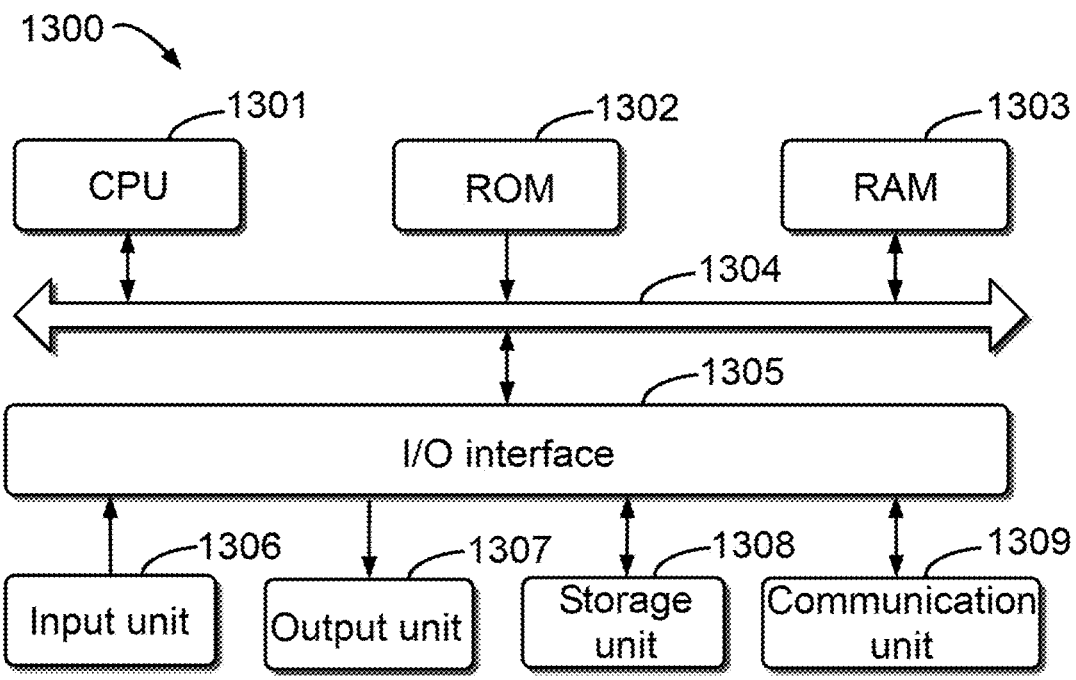
FIG. 13 illustrates a schematic structural diagram of a device that can be used to implement embodiments of the present disclosure.

FIG. 13 illustrates a schematic structural diagram of an example device 1300 that can be used to implement some embodiments of the present disclosure. The device 1300 may be implemented as a server or a PC. The embodiments of the present disclosure do not limit the specific implementation type of the device 1300. As shown in FIG. 13, the device 1300 includes a central processing unit (CPU) 1301 that may perform various appropriate actions and processing according to computer program instructions stored in a read-only memory (ROM) 1302 or computer program instructions loaded from a storage unit 1308 to a random access memory (RAM) 1303. Various programs and data required for the operation of the device 1300 may also be stored in the RAM 1303. The CPU 1301, the ROM 1302, and the RAM 1303 are connected to each other through a bus 1304. An input/Output (I/O) interface 1305 is also connected to the bus 1304.

A plurality of components in the device 1300 are connected to the I/O interface 1305, including: an input unit 1306, such as a keyboard and a mouse; an output unit 1307, such as various types of displays and speakers; a storage unit 1308, such as a magnetic disk and an optical disc; and a communication unit 1309, such as a network card, a modem, and a wireless communication transceiver. The communication unit 1309 allows the device 1300 to exchange information/data with other devices via a computer network such as the Internet and/or various telecommunication networks.

The processing unit 1301 may perform each of the methods and/or processes described above, such as the methods illustrated in FIGS. 11 and 12. For example, in some embodiments, the methods can be implemented as a computer software program that is tangibly included in a machine-readable medium such as the storage unit 1308. In some embodiments, part or all of the computer programs may be loaded and/or installed onto the device 1300 via the ROM 1302 and/or the communication unit 1309. When the computer program is loaded onto the RAM 1303 and executed by the CPU 1301, one or more steps of the method described above may be performed. Alternatively, in other embodiments, the CPU 1301 may be configured in any other suitable manners (e.g., by means of firmware) to perform the method.

The functions described herein above may be performed, at least in part, by one or a plurality of hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

In some embodiments, the methods and processes described above may be implemented as a computer program product. The computer program product may include a computer-readable storage medium on which computer-readable program instructions for performing various aspects of the present disclosure are loaded.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code can be completely executed on a machine, partially executed on a machine, partially executed on a machine as an independent software package and partially executed on a remote machine, or completely executed on a remote machine or a server.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, state setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams. The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

In the information of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combinations thereof.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two successive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the information of separate embodiments may also be implemented in combination in a single implementation. Conversely, various features that are described in the information of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

The embodiments of the present disclosure have been described above. The foregoing description is illustrative rather than exhaustive, and is not limited to the embodiments disclosed. Numerous modifications and alterations are apparent to those of ordinary skill in the art without departing from the scope and spirit of the illustrated embodiments. The selection of terms as used herein is intended to best explain the principles and practical applications of the various embodiments or the technical improvements to technologies on the market, or to enable other people of ordinary skill in the art to understand the various embodiments disclosed herein.

The invention claimed is:

1. A method for tracing information, comprising:
   receiving by a first service of a microservices application that is not one of a plurality of work containers of a microservices application, through a first application programming interface (API), an information acquisition request from a work container of the microservices application, the information acquisition request comprising information about a workload of the work container;
   determining by the first service, based on the information about the workload, a group to which the workload belongs, based on accessing a set of matching policies stored on a database that is external to the plurality of work containers to determine whether the workload matches any matching policy among the set of matching policies based on the information about the workload;

determining tracing information corresponding to the group, the tracing information being used for associating a log of the workload with logs of related workloads of the workload, wherein the first service stores the tracing information in the database that is external to the plurality of work containers and not in the plurality of work containers;

sending by the first service through the first API, the tracing information to the work container;

receiving by the first service through a second API, during a runtime of the microservices application, a runtime instruction for the set of matching policies, the runtime instruction comprising at least one of a create instruction, a modify instruction, and a delete instruction;

updating by the first service, during the runtime of the microservices application, the set of matching policies based on the runtime instruction including storing an update to the matching policies and corresponding tracing information in the database that is external to the plurality of work containers;

receiving by the first service, through the first API, a second information acquisition request from a second work container of the microservices application, the second information acquisition request comprising second information about a workload of the second work container;

determining by the first service, a second group to which the workload of the second work container belongs based on the updated set of matching policies and information about a workload of the second work container; and sending by the first service, through the first API, tracing information corresponding to the second group, to the second work container.

2. The method according to claim 1, wherein determining the group to which the workload belongs comprises:
    determining, in a predetermined order in the set of matching policies, whether the workload matches any matching policy among the set of matching policies based on the information about the workload; and
    determining, based on a determination that the workload matches a target matching policy, that the workload belongs to a group corresponding to the target matching policy.

3. The method according to claim 2, wherein determining whether the workload matches any matching policy comprises:
    determining, based on the information about the workload and information required for each matching policy, whether the workload matches any matching policy, wherein
    it is determined, if the information about the workload comprises information required for a given matching policy, that the workload matches the given matching policy; or
    it is determined, if the information about the workload does not comprise information required for a given matching policy, that the workload does not match the given matching policy.

4. The method according to claim 2, further comprising:
    stopping matching between the workload and any matching policy in response to determining that the group to which the workload belongs has been determined.

5. The method according to claim 2, wherein the work container is a first work container, the method further comprising:
    sending the tracing information to the second work container in response to the group to which the workload of the second work container the same as the group to which the workload of the first work container belongs.

6. The method according to claim 1, wherein updating the set of matching policies comprises creating a new matching policy in the database that stores the set of matching policies, modifying an existing matching policy in the database, or deleting an existing matching policy in the database.

7. The method according to claim 1, further comprising: determining that a target matching policy is a matching policy of a target type, and that the number of workloads in the group reaches a predetermined threshold; and generating an instruction for deleting the target matching policy from the set of matching policies.

8. The method according to claim 1, further comprising:
    generating new tracing information about the workload in response to determining that the workload does not belong to any group.

9. The method according to claim 1, wherein the information about the workload comprises at least one of an identifier of the workload, an identifier of the work container, and a work time for the workload.

10. The method according to claim 1, wherein the workload is from a workload controller associated with the work container, the workload controller being used to allocate at least a portion of an input load as the workload to the work container.

11. An electronic device, comprising:
    a processor; and
    a memory coupled to the processor and having instructions stored therein, wherein the instructions, when executed by the processor, cause the electronic device to perform operations comprising:
    receiving by a first service of a microservices application that is not one of a plurality of work containers of a microservices application, through a first application programming interface (API), an information acquisition request from a work container of the microservices application, the information acquisition request comprising information about a workload of the work container;
    determining by the first service, based on the information about the workload, a group to which the workload belongs based on accessing a set of matching policies stored on a database that is external to the plurality of work containers to determine whether the workload matches any matching policy among the set of matching policies based on the information about the workload;
    determining tracing information corresponding to the group, the tracing information being used for associating a log of the workload with logs of related workloads of the workload wherein the first service stores the tracing information in the database that is external to the plurality of work containers and not in the plurality of work containers;
    sending by the first service, through the first API, the tracing information to the work container;

receiving, by the first service, through a second API, during a runtime of the microservices application, a runtime instruction for the set of matching policies, the runtime instruction comprising at least one of a create instruction, a modify instruction, and a delete instruction;

updating by the first service, during the runtime of the microservices application, the set of matching policies based on the runtime instruction including storing an update to the matching policies and corresponding tracing information in the database that is external to the plurality of work containers;

receiving by the first service, through the first API, a second information acquisition request from a second work container of the microservices application, the second information acquisition request comprising second information about a workload of the second work container;

determining by the first service, a second group to which the workload of the second work container belongs based on the updated set of matching policies and information about a workload of the second work container; and sending by the first service, through the first API, tracing information corresponding to the second group, to the second work container.

12. The electronic device according to claim 11, wherein determining the group to which the workload belongs comprises:

determining, in a predetermined order in the set of matching policies, whether the workload matches any matching policy based on the information about the workload; and determining, based on a determination that the workload matches a target matching policy, that the workload belongs to a group corresponding to the target matching policy.

13. The electronic device according to claim 12, wherein determining whether the workload matches any matching policy comprises:

determining, based on the information about the workload and information required for each matching policy, whether the workload matches any matching policy, wherein it is determined, if the information about the workload comprises information required for a given matching policy, that the workload matches the given matching policy; or it is determined, if the information about the workload does not comprise information required for a given matching policy, that the workload does not match the given matching policy.

14. The electronic device according to claim 12, wherein the operations further comprise:

stopping matching between the workload and any matching policy in response to determining that the group to which the workload belongs has been determined.

15. The electronic device according to claim 12, wherein the work container is a first work container, the operations further comprising:

sending the tracing information to the second work container in response to the group to which the workload of the second work container is the same as the group to which the workload of the first work container belongs.

16. The electronic device according to claim 11, wherein updating the set of matching policies comprises creating a new matching policy in the database that stores the set of matching policies, modifying an existing matching policy in the database, or deleting an existing matching policy in the database.

17. The electronic device according to claim 11, wherein the operations further comprise: determining that a target matching policy is a matching policy of a target type, and that the number of workloads in the group reaches a predetermined threshold; and generating an instruction for deleting the target matching policy from the set of matching policies.

18. The electronic device according to claim 11, wherein the operations further comprise:

generating new tracing information about the workload in response to determining that the workload does not belong to any group.

19. The electronic device according to claim 11, wherein the information about the workload comprises at least one of an identifier of the workload, an identifier of the work container, and a work time for the workload.

20. A computer program product comprising: a non-transitory computer-readable medium and computer-executable instructions, wherein the computer-executable instructions, when executed, cause a computer to perform the following operations:

receiving by a first service of a microservices application that is not one of a plurality of work containers of a microservices application, through a first application programming interface (API), an information acquisition request from a work container of the microservices application, the information acquisition request comprising information about a workload of the work container;

determining by the first service, based on the information about the workload, a group to which the workload belongs, based on accessing a set of matching policies stored on a database that is external to the plurality of work containers to determine whether the workload matches any matching policy among the set of matching policies based on the information about the workload;

determining tracing information corresponding to the group, the tracing information being used for associating a log of the workload with logs of related workloads of the workload, wherein the first service stores the tracing information in the database that is external to the plurality of work containers and not in the plurality of work containers;

sending by the first service through the first API, the tracing information to the work container;

receiving by the first service through a second API, during a runtime of the microservices application, a runtime instruction for the set of matching policies, the runtime instruction comprising at least one of a create instruction, a modify instruction, and a delete instruction;

updating by the first service, during the runtime of the microservices application, the set of matching policies based on the runtime instruction including storing an update to the matching policies and corresponding tracing information in the database that is external to the plurality of work containers;

receiving by the first service, through the first API, a second information acquisition request from a second work container of the microservices application, the second information acquisition request comprising second information about a workload of the second work container;

determining by the first service, a second group to which the workload of the second work container belongs based on the updated set of matching policies and information about a workload of the second work container; and sending by the first service, through the first API, tracing information corresponding to the second group, to the second work container.

\* \* \* \* \*